July 17, 1962 A. C. LIND 3,044,627
COVER FOR OIL SEPARATORS
Filed Nov. 10, 1958 2 Sheets-Sheet 2

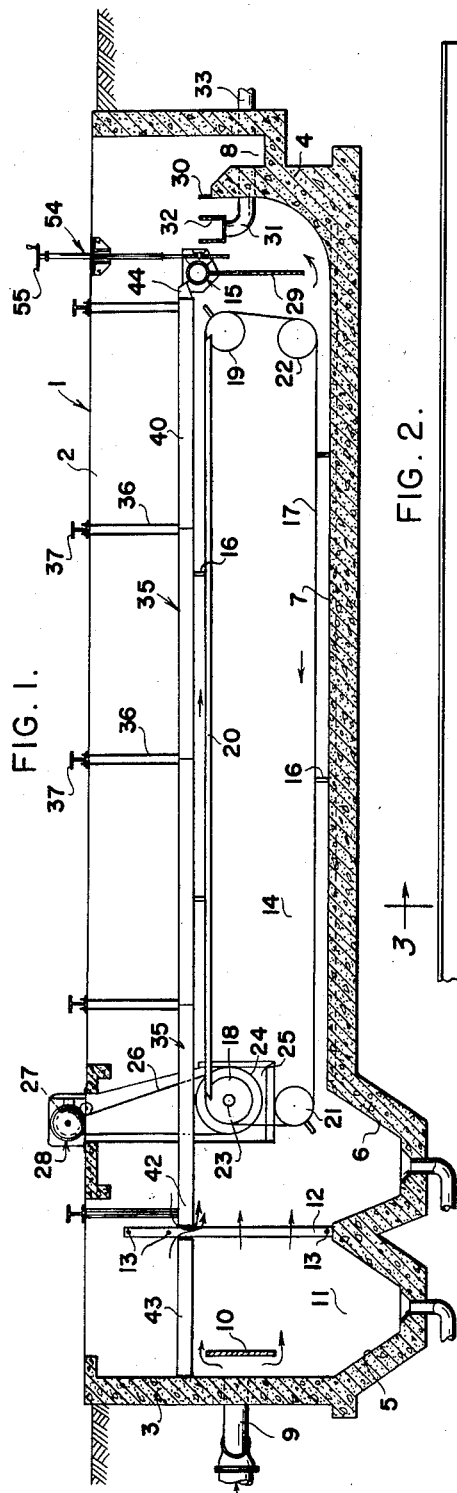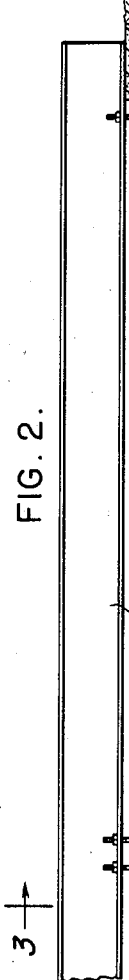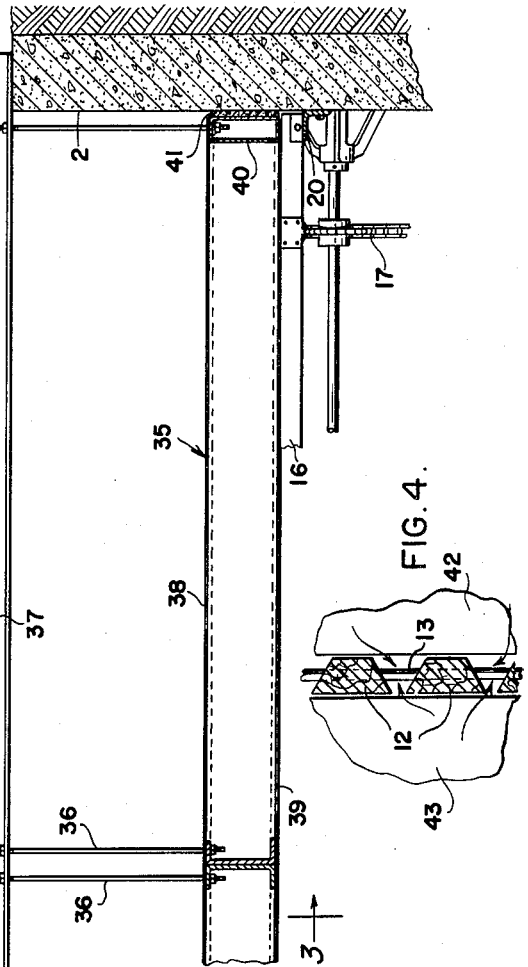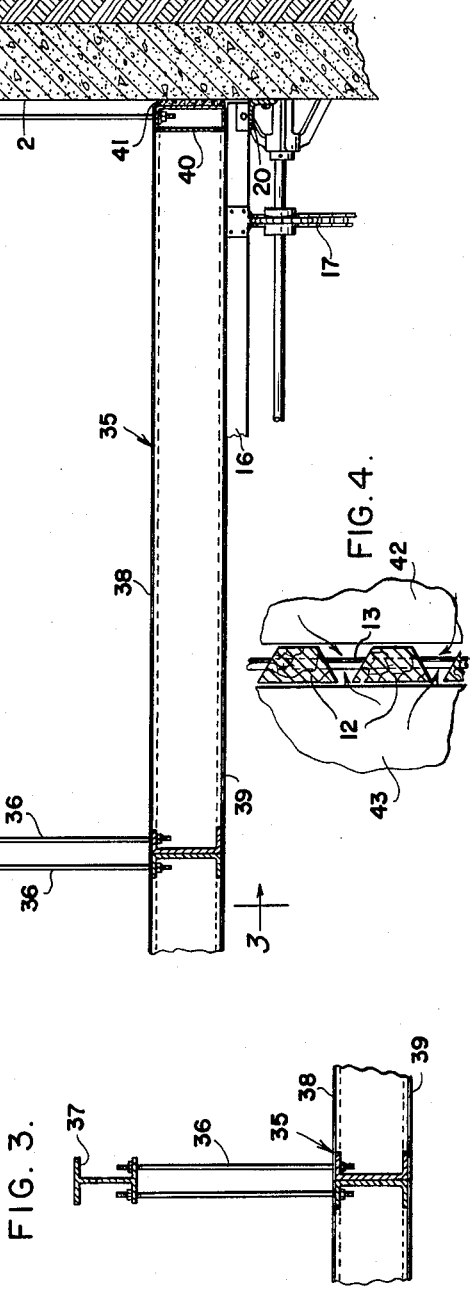

INVENTOR.
ARTHUR C. LIND

BY *Ernst W. Schultz*

ATTORNEY

United States Patent Office 3,044,627
Patented July 17, 1962

3,044,627
COVER FOR OIL SEPARATORS
Arthur C. Lind, Wauwatosa, Wis., assignor to Chain Belt Company, Milwaukee, Wis., a corporation of Wisconsin
Filed Nov. 10, 1958, Ser. No. 772,880
5 Claims. (Cl. 210—170)

This invention relates to oil-water separators and particularly to closure means for minimizing the evaporation of the lighter parts of the floating oil and escape of fumes from the tank.

Although the invention may have various applications, it is particularly intended for the gravity separation of the oil from refinery waste-water. The oil-water mixture is customarily introduced into one end of an open tank to flow by gravity through the tank. The oil floats to the water surface and forms a scum which is pushed by a series of flights toward removal means comprising a rotatable scum trough. The scum is withdrawn periodically and the waste water passes below the scum trough and then over a weir into an outlet trough or box.

The present invention provides an improved cover structure which minimizes the exposure of the floating oil or scum to the air, thereby reducing or minimizing the escape of fumes from the tank. The cover structure is supported within the tank just above the flights and extends the width of the tank and from the influent end thereof to the trough referred to. The lower surface of the cover is below the level of the water in the tank as maintained by the outlet weir and is pitched upwardly toward the scum trough to promote the movement of the floating oil toward the trough.

The upper surface of the cover is pitched downwardly toward the influent end of the tank where the rain-water flows into the tank for processing with the waste water.

A principal object of the invention is to allow the operator to periodically remove the scum from beneath the cover by means of the scum trough and to regulate the same as required.

Another object is to provide for the draining of rain-water from the top of the cover and the separation of dirt and grit washing from the cover with the rain-water.

Another object is to provide a cover structure which can be readily fabricated in sections and assembled while being installed within the tank.

Another object is to provide a cover which may be set within the tank to provide any given freeboard as required by the elevation of the rest of the plant.

The drawings furnished herewith illustrate the best mode of carrying out the present invention as presently contemplated and set forth hereinafter.

In the drawings:

FIGURE 1 is a longitudinal, vertical cross-section of a separator having two solids receiving hoppers and a collector mechanism shown diagrammatically;

FIG. 2 is an enlarged cross-sectional view of a part of the tank cover and showing a part of the collector mechanism in elevation;

FIG. 3 is a cross-section taken on line 3—3 of FIG. 2;

FIG. 4 is an enlarged horizontal cross-section of a number of the distribution baffles of the tank and shows the passages through which the rain-water from the adjoining covers is allowed to drain;

Figure 7:
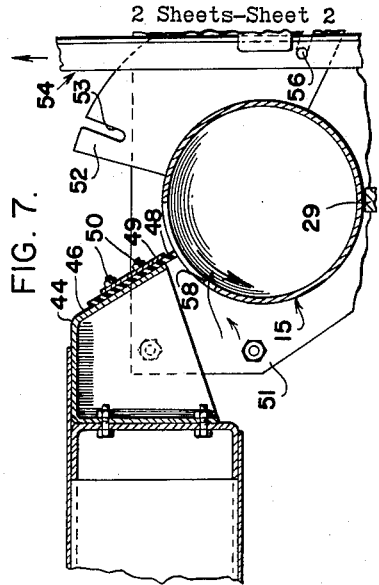
FIG. 7 is a view similar to FIG. 6 but showing the trough in position for receiving the scum.
Figure 5:
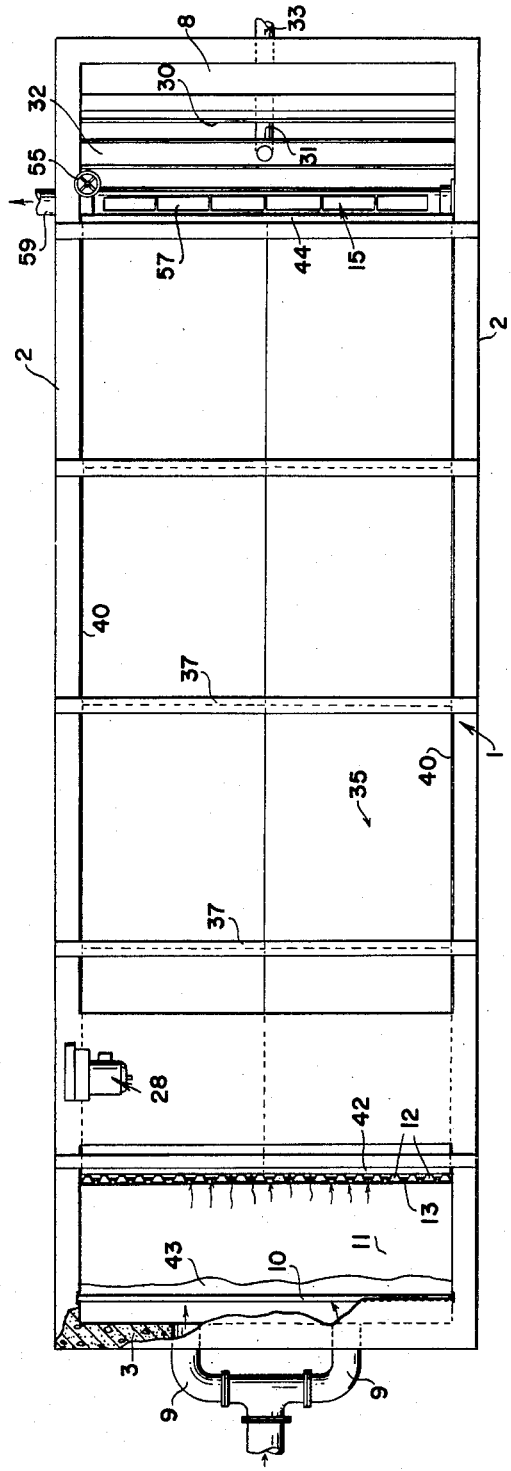
FIG. 5 is a plan view of the tank shown in FIG. 1.
Figure 6:
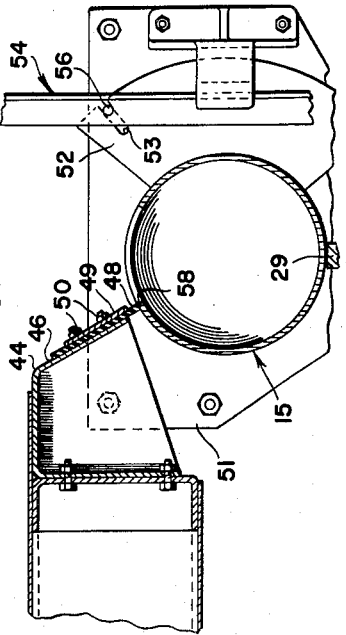
FIG. 6 is an enlarged cross-section of the skimming trough and seal carried by the end of the cover.

The tank 1 shown in the drawings is of concrete construction and includes the side walls 2 and end walls 3 and 4. The bottom of the tank includes the first and second solids-receiving hoppers 5 and 6 at the inlet end of the tank and the flat floor 7 which extends from hopper 6 to the outlet box 8 extending across the outlet end of the tank. The branch pipes 9 having ends set in wall 3 open in the direction of the baffle 10 and introduce the oil-water mixture into the inlet zone 11 of the tank above hopper 5.

The vertical distribution-baffles 12 set between hoppers 5 and 6 are preferably joined by cross-members to comprise a unitary structure for ease of removal and cleaning and are shown joined by the rods 13. The baffles serve to distribute the oil-water mixture throughout the cross-section of the separation zone 14 of the tank which extends from baffles 12 to the trough 15 near the outlet end of the tank.

The collector mechanism operating within separation zone 14 includes the series of flights 16 connecting two parallel strands of chain 17. Flights 16 along the upper run of the chains operating over sprockets 18 and 19 push the floating material or scum toward trough 15. Each end of the flights referred to are supported by a rail 20 extending between sprockets and secured to the wall 2 of the tank. The flights 16 along the lower run of the chain operating over sprockets 21 and 22 push the solids having settled on floor 7 toward the hopper 6. Shaft 23 carrying sprockets 18 also carries the gear 24 having an offset periphery extending within the recess 25 formed in the side wall 2 of tank 1. The chain 26 operating in recess 25 connects gear 24 and the drive gear 27 of motor unit 28 mounted on top of side wall 2 for operation of flights 16.

As described and shown in expired Patent No. 1,956,-206, the locating of chain 26 in recess 25 allows the flights 16 to extend the full width of the tank without interference with the chain as the flights pass around sprocket 18.

The wall or baffle 29 directly beneath trough 15 and extending the width of the tank is spaced from the bottom of the tank to allow the clear waste-water to pass thereunder without disturbing any solids settled on floor 7. Baffle 29 may be provided with a seal, not shown, to engage the underside of trough 15, or may be of wood and contact the trough directly to provide an adequate seal. The waste-water moves upwardly between baffle 29 and end wall 4 of tank 1 and over the weir 30 into the outlet box 8. The pipe 31 from the over-flow trough 32 discharges into outlet box 8. The trough 32 provides additional weir-length and with weir 30 maintains the liquid level in the tank to within a fraction of an inch.

The waste-water is discharged from the tank through pipe 33 to whatever storage or natural water-shed it is directed, and the flow to and from the tank by gravity is preferably arranged to avoid pumping costs. This means, however, that the liquid-level referred to may be considerably below the grade elevation at the tank so that the tank may have to be set deep in the ground and provided with a considerable freeboard, or height above the water-line.

The present invention provides the cover 35 which is suspended by the rods 36 from the several beams 37 extending across tank 1, and is partially submerged so that all air is excluded from the upper surface of the floating oil. Recess 25 is closed with a mastic, not shown, inserted around chain 26 to substantially close the recess between the side 2 of tank 1 and the adjoining cover 35.

The cover comprises individual sections which may be bolted or welded together at the site of the tank or as they are installed in the tank. The cover includes the flat upper and lower plates 38 and 39, respectively, and has side sections 40 which fit sufficiently close to the side walls 2 of the tank to allow filling and sealing the space therebetween with grout or plastic, oil-resistant composition 41. The upper surface of cover 35 is slightly pitched downwardly toward baffles 12 which extend upwardly between the adjacent end 42 of cover 35 and the cover 43 located over the inlet zone 11. Cover 43 may not in some cases be required but would be preferable wherever appreciable separation of oil occurs ahead of baffles.

Since there is a small head-loss of the flow in passing between the baffles, cover 43 might or could have a slightly higher elevation.

The baffles 12 are preferably removable from the tank by lifting vertically for access and cleaning or for replacement and because of the velocity of the flow between the baffles, no seal is provided or necessary. That is, the spaces between the baffles and the covers 35 and 43 are open to the atmosphere according to the invention, so that the rain-water on the cover flows toward the baffles 12 and downwardly into the spaces referred to, to merge with the flow through the tank. The rain-water is thus readily and conveniently disposed of without requiring a separate channel therefor. The rain-water carried into the tank will initially include the sand, grit and grime which has settled on the cover between rains and which may be considerable amounts depending upon surrounding conditions and the frequency of the rains. This material is washed from the cover by the rain-water and settled out in the tank and the rain-water is then suitable for disposal or plant use with the waste-water which has been processed.

The pitch of the lower surface of cover 35 upwardly toward trough 15 aids in the movement of the separated and floating oil to the trough by flights 16. The end section 44 of cover 35 adjacent to trough 15 includes the inclined face 46 and is preferably reenforced internally by spaced members. The sealing strip 48 extending the width of the tank is secured flat against face 46 of section 44 by the metal member 49 and bolts 50. Bolts 50 are studs welded to section 44 and project through suitable slots, not shown, in strip 48 and holes in member 49. Strip 48 is disposed so that it lies in a plane approximately intersecting the axis of rotation of trough 15 and is adjusted so that its lower edge is in contact with the trough throughout its length.

Trough 15 is similar to that shown and described in the presently copending application Serial No. 605,167, now Patent No. 2,863,565, and is supported at opposite ends in suitable bearings having recessed flanges 51 bolted to side walls 2. The plate 52 provided with the slots 53 is located at one end of the trough and is fixed to the side thereof oppositely of the cover 35. The operating mechanism 54 includes the operator's handwheel 55 located above the tank and the pins 56 which are moved vertically by threaded means, not shown, and which engage plate 52 in the slots 53 to effect rotation of the trough.

Trough 15 comprises a steel cylinder or pipe with a series of spaced rectangular openings 57 which extend along the top of the pipe in the upright or closed position of the trough. The openings substantially extend the width of the tank so that when the trough is rotated, as by handwheel 55, the side of the openings forming the lip 58 is lowered to below the level of the floating oil which then flows over lip 58 into the trough. One end of trough 15 is open and communicates with the pipe 59, through which the collected oil or scum is discharged from the tank.

When trough 15 is in the closed position with openings 57 facing upwardly, sealing strip 48 engages the trough throughout the length thereof and along or near the lip 58. When the trough is rotated to lower lip 58 to below the level of the floating oil, the sealing strip extends across the openings and the openings are disposed to allow the operator at handwheel 55 to watch the flow of scum or floating oil in the trough. The operator is then able to control properly the withdrawal of the scum in a minimum amount of time and to then return the trough to the upright position. In doing so the seal between trough 15 and cover 35 is immediately reestablished and the escape of fumes is minimized.

The trough 15 is of sufficient size so that lip 58 has sufficient vertical travel from above seal 48 to below the level of the scum for skimming or decanting. The size of the trough also determines the maximum size of the openings 57 which provide the apertures by which the skimming may be observed.

Cover 35 has a thickness or height and is partially submerged so that the floating oil collected and moved toward trough 15 by flights 16 is under some head and remains under the head referred to until reaching the space beneath end section 44 of cover 35 adjacent to the trough. When the trough is turned for skimming, the floating oil moves more rapidly under the cover and toward the trough so that the skimming may be accomplished in a minimum length of time. The baffle or wall 29 extending the width of the tank, prevents the collected floating oil at the trough from being carried out of the tank with the waste-water.

The several sections of cover 35, being air-tight, are buoyant or may approach buoyancy so that the water level maintained within the tank should not vary or be allowed to lift the cover and break up the material sealing the edges of the cover with the walls of the tank. The trough 32 with weir 30 provides sufficient weir length which prevents surge flows from appreciably raising the water level and maintains the water level within limits which are appreciably less than the height or thickness of the cover structure.

Various modes of carrying out the invention are contemplated as within the scope of the following claims particularly pointing out and distinctly claiming the subject matter which is regarded as the invention.

I claim:

1. In a tank for the separation of floatable, volatile substances from water, influent means at one end of the tank and a wall at the other end thereof providing a submerged outlet, a cylindrical trough disposed along said wall and having an upper opening extending substantially the length of the trough and across the tank, the ends of said trough being rotatably supported within the tank and said trough having manually operable means above the tank for effecting rotation of the trough from an upright positon and to lower the trough opening to a position for entry of the scum formed by the floating substances into the trough for periodic withdrawal and discharge from the tank, and a partially submerged cover to normally prevent the escape of fumes from the tank and comprising an air-tight structure extending the width of the tank and from the influent end thereof to a space adjacent to said trough, the end of said cover extending alongside said trough having a sealing member extending the width of the tank and closing said space, said member being disposed to engage the trough just below the opening of the trough in the upright position and to normally close the space between the cover and the trough, said trough opening in said lower position being disposed to extend both above and below said seal to provide for the entry of the scum into the trough during periods of withdrawal of the scum and allow the operator to observe the same and return the trough to the upright position in a minimum of time.

2. In a tank for the separation of floatable, volatile substances from water, influent means at one end of the tank and a wall at the other end thereof providing a submerged outlet, a cylindrical trough disposed along said wall and having an upper opening extending substantially the length of the trough and across the tank, the ends of said trough being rotatably supported within the tank and said trough having manually operable means above the tank for effecting rotation of the trough from an upright position and to lower the trough opening to a position for entry of the scum formed by the floating substances into the trough for periodic withdrawal and discharge from the tank, and a partially submerged cover to normally prevent the escape of fumes from the tank and comprising an air-tight structure extending the width of the tank and from the influent end thereof to said trough, the end of said cover extending alongside said trough having a sealing member extending the width of the tank, said member being disposed to engage the trough just below the opening of the trough in the upright position and to normally close the space between the cover and the trough, said trough opening in said lower position being disposed to extend both above and below said seal to allow the operator to observe the entry of the scum into the trough during periods of withdrawal of the scum.

3. In a tank for the separation of oil from water with a minimum of exposure of the oil to the atmosphere, said tank having side and end walls and a floor, baffles spaced from the respective end walls of the tank and extending across the tank to define a separation zone therebetween, the first baffle having a series of vertical openings for the distribution of the flow into said zone, the second baffle being spaced from the tank floor to provide the outlet for the water from said zone and having a rotatable scum trough extending along the top of the baffle, the end wall of the tank adjacent said second baffle having an overflow weir providing the discharge of the water from the tank and determining the level of the water in the tank, cover means closing said zone comprising a number of air-tight members suspended within the tank, the member adjacent to said first baffle extending below said water level and the member adjacent to said trough extending above said water level and the members together having a downward slope for rain water to be collected toward said first baffle and introduced into the tank through said openings and having an upward slope therebeneath for oil to be collected under a slight head toward said second baffle.

4. An oil and water separator for installation below grade to the depth required for the gravity flow of the oil and water therethrough, comprising a tank having inlet and outlet ends, a bottom and side walls, a series of distribution baffles extending across the tank at the inlet end thereof, overflow trough means at the outlet end of the tank for withdrawal of the water and including weir means disposed to maintain a certain water level within the tank within given limits, a cylindrical, rotatable trough for periodic skimming the floating oil collected adjacent thereto, a solid baffle extending across the tank immediately beneath said trough in effective sealing relation therewith and spaced from the bottom and outlet end of the tank, said baffles and skimming trough defining the separation zone of the tank, beams having ends supported on said side walls and extending across said separation zone, and a cover substantially closing the top of said separation zone and comprising a number of rectangular air-tight sections individually suspended from said beams, said cover having vertical dimensions such that at all times the entire underside is below and the entire top side is above said water level of the tank, said cover being disposed thereby to effect the submergence of the oil separated from the water therebeneath and said cover being pitched upwardly for movement of the submerged oil toward said trough for collection and skimming.

5. An oil and water separator for installation below grade to the depth required for the gravity flow of the oil and water therethrough, comprising a tank having a bottom and side walls and inlet and outlet ends and a separation zone therebetween, beams supported on said walls and extending across the separation zone of the tank, a cover closing the top of said separation zone comprising a number of rectangular air-tight sections individually suspended from said beams, said cover having vertical dimensions such that the entire underside is below and the entire top side is above a certain water level of the tank maintained within given limits, said cover being disposed thereby to effect the submergence of the oil separated from the water therebeneath and said cover being pitched upwardly for movement of the submerged oil toward the outlet end of the tank for withdrawal of the water and including weir means disposed to maintain said water level within the tank within said given limits, and means for skimming the oil collected at the outlet end of the tank.

References Cited in the file of this patent

UNITED STATES PATENTS

| | | |
|---|---|---|
| 1,855,982 | Mohr | Apr. 26, 1932 |
| 2,118,157 | Camp | May 24, 1938 |
| 2,211,565 | Hawley | Aug. 13, 1940 |
| 2,264,912 | Kupper | Dec. 2, 1941 |
| 2,337,859 | Stuller | Dec. 28, 1943 |
| 2,370,974 | Langdon | Mar. 6, 1945 |
| 2,585,878 | Tryon | Feb. 12, 1952 |